United States Patent [19]

Bleiweiss et al.

[11] 4,440,104
[45] Apr. 3, 1984

[54] EMERGENCY WARNING DEVICE

[75] Inventors: Arthur F. Bleiweiss, Toronto; Terence E. Base, London, both of Canada

[73] Assignee: Dominion Auto Accessories Limited, Toronto, Canada

[21] Appl. No.: 242,629

[22] Filed: Mar. 11, 1981

[51] Int. Cl.³ .............................................. G08B 5/00
[52] U.S. Cl. ................................... 116/63 T; 40/602; 40/903; 350/97
[58] Field of Search .................. 116/63 T, 209, 63 P, 116/63 C, 63 R; 40/602, 608, 606, 612, 903; 404/12, 13, 10; 52/24, 173, 473; 350/97, 102, 109

[56] References Cited

U.S. PATENT DOCUMENTS

| | | | |
|---|---|---|---|
| 3,625,177 | 12/1971 | Miller | 116/63 T |
| 3,759,214 | 9/1973 | Evans et al. | 116/63 T |
| 3,766,881 | 10/1973 | Ward | 116/63 P |
| 3,768,187 | 10/1973 | Punne | 40/125 N |
| 4,253,085 | 2/1981 | Hidler et al. | 116/63 R X |

FOREIGN PATENT DOCUMENTS 1502402  3/1978  United Kingdom ................. 40/903

Primary Examiner—S. Clement Swisher
Assistant Examiner—Tom Noland
Attorney, Agent, or Firm—Barnes, Kisselle, Raisch, Choate, Whittemore & Hulbert

[57] ABSTRACT

An emergency warning device comprising a base, three arms extending upwardly from the base to define an equilateral triangle, one of the arms extending horizontally on the base and the other two arms extending upwardly. Each arm has reflective and fluorescent portions on opposed surfaces thereof. The fluorescent portions of said arms comprising spaced walls and each wall has at least one opening therethrough. The opening in one wall is staggered with respect to the opening in the other wall such that portions of one wall overlie the opening in the other wall and such that air striking the device flows in a sinuous path through the device reducing the drag on the device.

2 Claims, 5 Drawing Figures

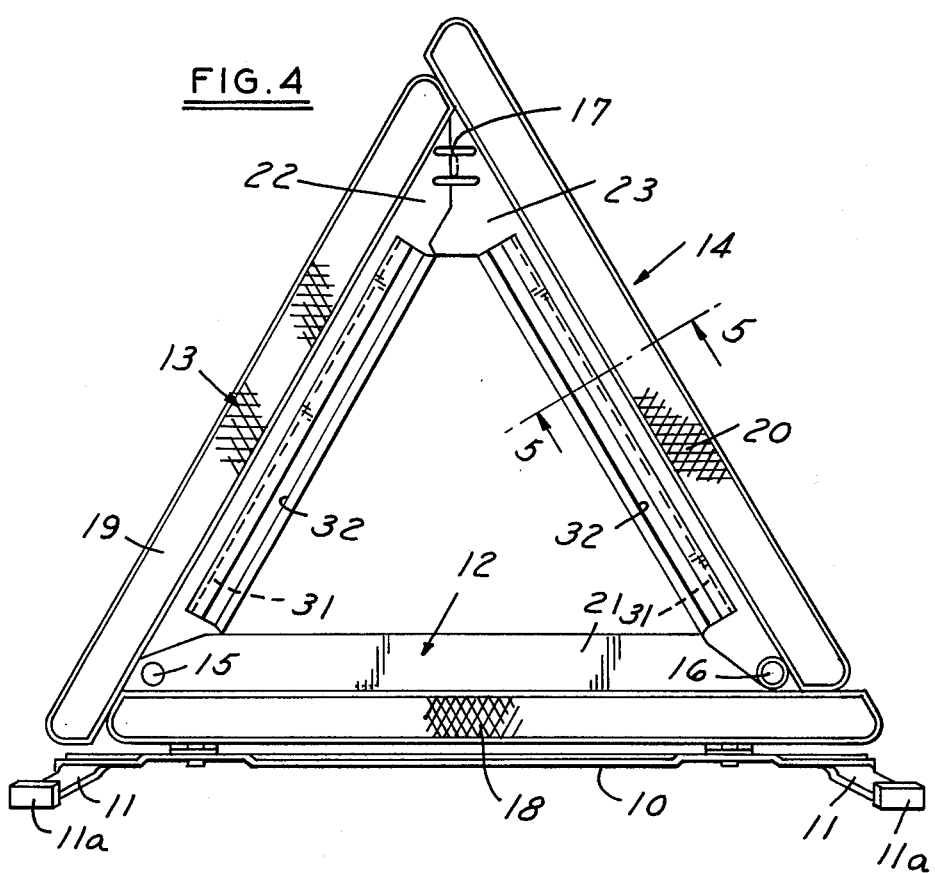
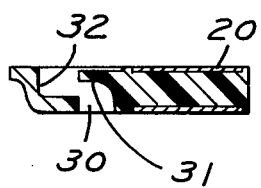

EMERGENCY WARNING DEVICE

This invention relates to emergency warning devices or flares.

BACKGROUND OF THE INVENTION

In recent times, emergency warning devices or flares have been designed to be carried in motor vehicles and used on the roadway to warn approaching traffic of the presence of a stopped vehicle. Such devices are intended to reduce deaths and injuries due to rear end collisions between moving traffic and disabled vehicles. Governmental regulations have been established to standardize the requirements for such devices in terms of size, configuration, color, reflectivity, luminance, stability and durability. Typical standards are the Motor Vehicle Safety Standard No. 125 in the United States and Canadian Standards Association standard D171 in Canada. These standards provide that the emergency warning device be triangular in shape and have red reflective material and orange fluorescent material on the opposed faces of the triangle. The standards further call for the warning device as having stability such that when the warning device is erected on a horizontal brush concrete surface, both with and against the brush marks and subjected to a horizontal wind of 40 m.p.h. in any direction for three minutes (a) no part of it shall slide more than three inches from its initial position; (b) its triangular portion shall not tilt to a position that is more than ten degrees from the vertical; and (c) its triangular position shall not turn through a horizontal angle of more than ten degrees in either direction from the initial position.

It has been shown in studies made by the present inventors and confirmed by The National Aeronautical Establishment, Ottawa, Canada, that the present standards on stability are inadequate to withstand the normal winds or the effect of a passing vehicle on the warning devices. Accordingly, The National Aeronautical Establishment has recently recommended that the weight of the device thus be increased to 9.6 lbs.

The problem with such a solution is that it would require an increase in the weight of present emergency road warning flares to about 250% or more of the present weight. Such a requirement would thus increase the weight that must be carried by the vehicle since each vehicle is presently required to carry three warning devices making it difficult and awkward to handle them, to attach them to the vehicle for storage and increasing fuel comsumption of the vehicle.

The present invention is to provide an improved emergency warning device which does not materially increase the weight to be carried by the vehicle; which effectively will withstand crosswinds and winds due to passing vehicles substantially above the present standards; and which preferably can be folded and stored in a volumetric area as emergency warning devices presently are stored.

Basically, the emergency warning device embodying the invention comprises forming the fluorescent portion of one or more of the arms with spaced walls, each of the walls being staggered with relation to the other wall so that the air passing from one side to the other of the device follows a sinuous path through an opening in one wall into the space between the walls and thereafter into the other opening.

DESCRIPTION OF THE DRAWINGS

FIG. 4 is an elevational view of a modified form of emergency warning device.

FIG. 5 is a sectional view on an enlarged scale taken along the line 5—5 in FIG. 4.

DESCRIPTION

Figure 1:
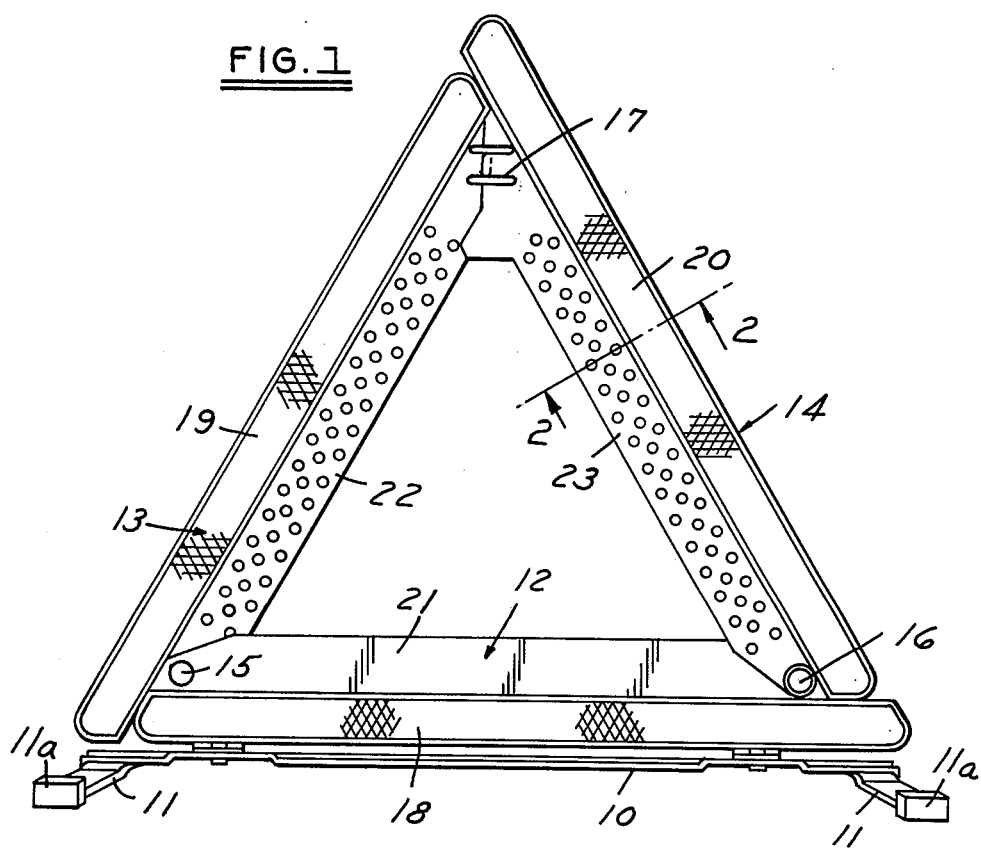
FIG. 1 is an elevational view of an emergency warning device embodying the invention.

Referring to FIG. 1, the emergency warning device is of the generally well known type comprising a base 10 having foldable legs 11 with ground engaging elastomeric pads 11a. The base 10 supports three arms 12, 13 and 14 that are pivoted to one another and unfoldable to define an equilateral triangle. Arm 12 is mounted on the base 10 and arms 13, 14 are pivoted to the ends of the arm 12 by rivets 15, 16 so that they can be extended from a folded condition to an unfolded condition as shown in FIG. 1 wherein the upper ends of the arms are connected to one another by a disconnectable connector 17.

Conventionally, arms 12, 13 and 14 include passive signal means in the form of reflective portions 18, 19, 20 formed by retroreflective elements such as cube corner reflectors and fluorescent portions 21, 22, 23 that are formed by fluorescent material. The reflective and fluorescent portions are required by regulations that have been established for such emergency warning devices.

Figure 2:
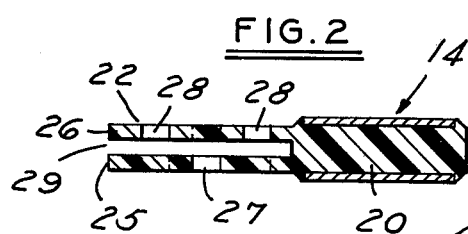
FIG. 2 is a fragmentary sectional view on an enlarged scale taken along the line 2—2.
Figure 3:
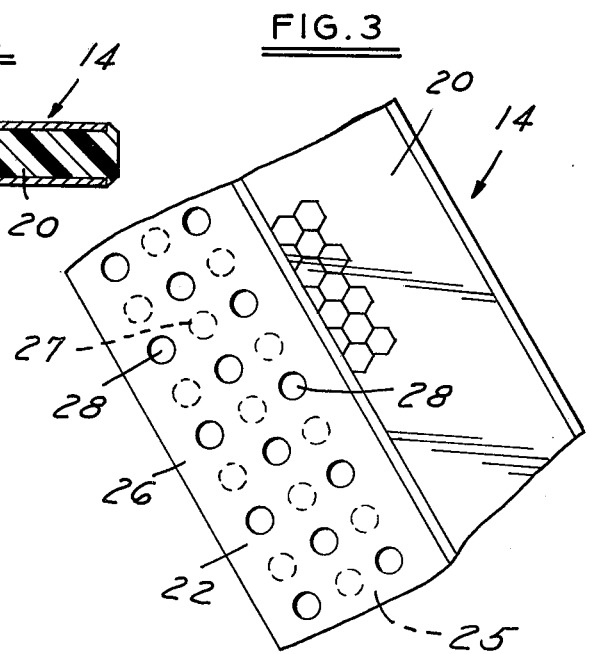
FIG. 3 is a fragmentary view of a portion of the device shown in FIG. 1 on an enlarged scale.

Referring to FIGS. 1–3, the fluorescent portions 22, 23 are defined by spaced walls 25, 26. Each wall has a set of openings 27, 28 uniformly distributed along the length thereof, the openings 27 in one wall being staggered with respect to the openings 28 so that they are not aligned one with the other. As a result, as the air acting on the device along the highway passes through one set of openings 27, it must first pass into the space 29 between the walls 25, 26 before passing through the other set of openings 28.

In this manner, the force of the air is dissipated reducing the tendency to move the device along the ground. Further, the overlapping of the openings retains the side fluorescent area as required by regulations controlling the design of the emergency warning devices.

In a preferred form, the openings are circular, have a diameter of 3/16" (0.48 cm.) and are uniformly distributed along the entire length of the fluorescent portion.

In the form of the invention shown in FIGS. 4 and 5, portions of the fluorescent portions 22, 23 are formed with spaced slots that extend generally parallel to the arms which define a sinuous cross section as at 30. The sinuous cross section is such that the air first strikes a forwardly facing concave surface 31 and then a rearwardly facing concave surface 32 such that the direction of the air is changed twice before it passes through the slot. The first surface 31 deflects the air laterally and, since the slots extend along the inclined arms 13, 14, while the concave surfaces 32 redirect the air so that it flows through and the force of the air is dissipated further reducing the force tending to move the device along a road surface.

We claim:
1. An emergency warning device comprising a base, three arms extending upwardly from the base to define a triangle, one of said arms extending horizontally on said base and said other two arms extending upwardly and inwardly, each arm having passive signal means on at least one surface thereof, at least a portion of one of said arms comprising spaced walls, each said wall having at least one opening therethrough, the opening in one wall being staggered with respect to the opening in the other wall such that portions of one wall overlie the opening in the other wall and such that air striking the device flows in a sinuous path through the device reducing the drag on the device, each opening comprising a slot extending along the length of said one arm, said slots being formed in said upwardly extending arms, each of said slots extending along the length of said arm, the slots and the space between the spaced walls forming an air flow passage that is sinuous in cross section, one said slot including a concave forwardly facing surface and the other said slot including a concave rearwardly facing surface such that air first strikes a forwardly facing concave surface and then a rearwardly facing concave surface such that the direction of the air is changed twice before it passes through the slots.

2. An emergency warning device comprising
a base,
three arms extending upwardly from the base to define a triangle, one of said arms extending horizontally on said base and said other two arms extending upwardly and inwardly from said base to define a plane, said plane containing said triangle, each arm having passive signal means on at least one surface thereof, at least a portion of one of said arms having said passive signal means comprising opposed spaced walls, each said wall having at least one opening therethrough, the opening in one wall being staggered transversely with respect to the opening in the other wall such that portions of one wall overlie the opening in the other wall and such that air striking the device at a substantially right angle to the plane of the triangle flows through one opening into the space between said walls and thereafter through the other opening in a sinuous path through the device out of the plane of the triangle at a substantially right angle thereto thereby reducing the drag on the device, each opening comprising a slot in each wall extending along the length of said one arm, said slots being formed in both said upwardly extending arms and extending longitudinally along said upwardly extending arms, one said slot including a concave forwardly facing surface and the other said slot including a concave rearwardly facing surface such that air first strikes a forwardly facing concave surface and then a rearwardly facing concave surface such that the direction of the air is changed twice before it passes through the slots.

* * * * *